(12) United States Patent
Mehas et al.

(10) Patent No.: US 11,218,347 B2
(45) Date of Patent: Jan. 4, 2022

(54) ASK MODULATION

(71) Applicant: Renesas Electronics America Inc., Milpitas, CA (US)

(72) Inventors: Gustavo Mehas, Mercer Island, WA (US); Nicholaus Smith, La Mesa, CA (US); Detelin Martchovsky, Fremont, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/891,619

(22) Filed: Jun. 3, 2020

(65) Prior Publication Data
US 2021/0385114 A1 Dec. 9, 2021

(51) Int. Cl.
*H02J 50/12* (2016.01)
*H04L 27/04* (2006.01)

(52) U.S. Cl.
CPC .............. *H04L 27/04* (2013.01); *H02J 50/12* (2016.02)

(58) Field of Classification Search
CPC .................................. H04L 27/04; H02J 50/12
See application file for complete search history.

(56) References Cited

U.S. PATENT DOCUMENTS

| | | | |
|---|---|---|---|
| 2014/0191568 A1* | 7/2014 | Partovi ................... | H02J 50/12 307/9.1 |
| 2019/0013728 A1* | 1/2019 | Liu .......................... | H02M 1/32 |
| 2019/0238000 A1* | 8/2019 | Salvekar ................. | H02J 7/025 |
| 2019/0312459 A1* | 10/2019 | Garbus ............... | H02J 7/00034 |
| 2020/0244067 A1* | 7/2020 | Taya ....................... | G05F 1/575 |

* cited by examiner

*Primary Examiner* — Dac V Ha
(74) *Attorney, Agent, or Firm* — Haynes and Boone, LLP

(57) ABSTRACT

In accordance with some embodiments of the present invention, a wireless power receiver that ramps an ASK impedance is presented. A method of amplitude shift key (ASK) modulation in a wireless power receiver includes initiating transition of an ASK impedance from a first state to a second state, the ASK impedance being coupled to a resonant circuit that includes a wireless power receive coil that receives a time-varying magnetic field; transitioning the ASK impedance from the first state to the second state according to the transition over a plurality of switching cycles of the time-varying magnetic field; and holding the second state.

24 Claims, 8 Drawing Sheets

ASK MODULATION

TECHNICAL FIELD

Embodiments of the present invention are related to wireless power systems and, specifically, to a wireless power receiver with improved amplitude shift key (ASK) modulation.

DISCUSSION OF RELATED ART

Typically, a wireless power system includes wireless power transmitter that drives a transmitter coil to produce a time-varying magnetic field and wireless power receiver with a receiver coil that is positioned relative to the transmitter coil to receive the power transmitted in the time-varying magnetic field. Many wireless power standards, for example the Qi standard, allow for using the wireless power signal between the transmitter coil and the receiver coil as an in-band communications channel. In particular, the wireless power transmitter transmits data to the wireless power receiver by modulating the frequency, typically using frequency shift keying (FSK) modulation. The wireless power receiver transmits data to the wireless power transmitter by modulating the amplitude, typically using amplitude shift keying (ASK) modulation. This modulation is typically performed by modulating impedances in the wireless power receiver that is detectable by the wireless power transmitter.

However, such ASK modulation can have detrimental effects. In particular, modulating the impedance of the resonant circuit formed by the receiver coil in such a fashion can cause inadvertent current and voltage spikes in the receiver coil. These spikes may be damaging to components of the wireless power receiver. Consequently, there is a need to provide for ASK modulation in the receiver while reducing the detrimental effects of such modulation.

SUMMARY

In accordance with some embodiments of the present invention, a wireless power receiver that transitions an ASK impedance over several switching cycles of the received time-varying magnetic field is presented. A method of amplitude shift key (ASK) modulation in a wireless power receiver includes initiating transition of an ASK impedance from a first state to a second state, the ASK impedance being coupled to a resonant circuit that includes a wireless power receive coil that receives a time-varying magnetic field; transitioning the ASK impedance from the first state to the second state according to the transition over a plurality of switching cycles of the time-varying magnetic field; and holding the second state.

A wireless power receiver with ASK modulation includes a rectifier coupled to receive wireless power from a resonant circuit that includes a receiver coil; an impedance control circuit coupled to ASK impedances coupled to affect impedance of the resonant circuit; and a controller coupled to the rectifier and the impedance controller, wherein the controller executes instructions to initiate transition of the ASK impedances from a first state to a second state; transition the ASK impedance from the first state to the second state according to the transition over a plurality of switching cycles of a time-varying magnetic field received by the resonant circuit; and hold the second state.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

The figures are not drawn to scale. Relative sizes of components are not indicative of actual sizes. In the figures, electrical connections are designated with a solid dot while lines that simply cross are not connected.

Figure 1:
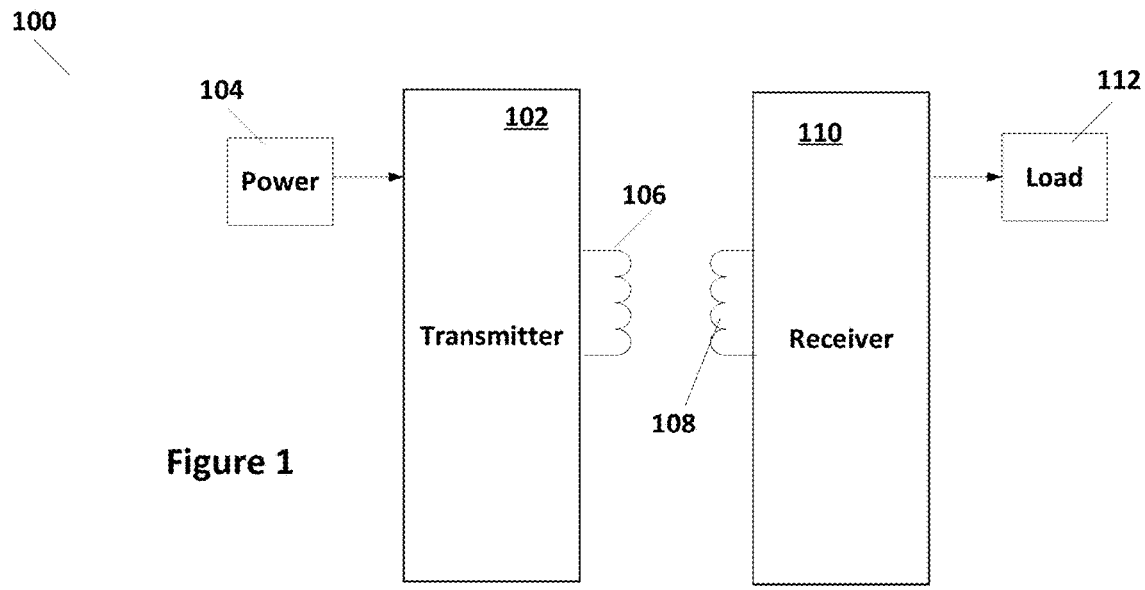
FIG. 1 illustrates a wireless power transmission system.

FIG. 1 illustrates a system 100 for wireless transfer of power. As illustrated in FIG. 1, a wireless power transmitter 102 drives a coil 106 to produce a magnetic field. A power supply 104 provides power to wireless power transmitter 102. Power supply 104 can be, for example, a battery-based supply or may be powered by an alternating current for example a 240V at 50 Hz or 120 V at 60 Hz standard supply. Wireless power transmitter 102 drives coil 106 at a range of switching frequencies, typically according to one of the wireless power standards, to transmit a time-varying magnetic field. Embodiments according to the present disclosure can be applicable to any frequency where it is practical to transfer power and/or information with magnetic coils irrespective of any standard that may exist.

As is further illustrated in FIG. 1, the time-varying magnetic field produced by coil 106 induces a current in receive coil 108, which results in power being received in a wireless power receiver 110. Receiver 110 receives the power from coil 108 and provides power to a load 112, which may be a battery charger and/or other components of a mobile device. Receiver 110 typically includes rectification to convert the received AC power received by receive coil 108 to DC power for load 112.

There are multiple standards for wireless transmission of power, including the Wireless Power Consortium standard, the Qi Standard. Under the Wireless Power Consortium (WPC), the Qi specification, a resonant inductive coupling system is utilized to charge a single device at the resonance frequency of the device, which usually operates between about 80 to about 200 kHz. Most systems operated between 110 kHz and 148 kHz. In the Qi standard, coil 108 is placed in close proximity with coil 106. In Qi standard systems, power level increases as the frequency decreases, often peaking at around 100 kHz. Many Qi system designs vary the input voltage to achieve high power delivery. In some embodiments, the typical operating frequency is 127.7 kHz. FIG. 1 depicts a generalized wireless power system 100 that operates under any of these standards.

Figure 2:
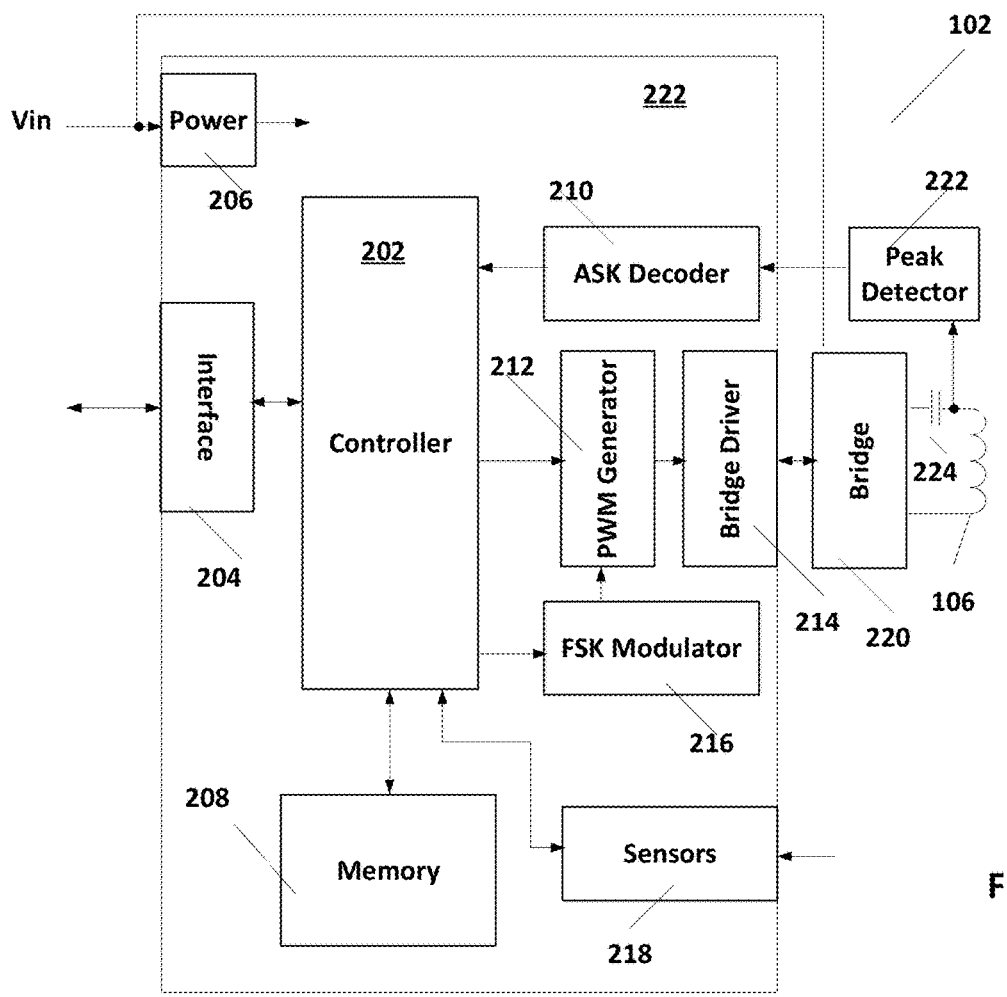
FIG. 2 illustrates a wireless power transmitter.

FIG. 2 illustrates a wireless power transmitter 102. As illustrated in FIG. 2, wireless power transmitter 102 transmit coil 106 is coupled through a capacitor 224 with a bridge 220. Bridge 220 may be a half bridge or a full bridge field-effect transistor (FET) based driver to supply alternating current through transmit coil 106. The alternating current through transmit coil 106 provides for a time varying magnetic field, or wireless power signal, that is received by receiver coil 108. The FETs of bridge 220 is driven by a bridge driver 214 that is coupled to the gates of the FETs. Bridge driver 214 is driven by a pulse-width modulation (PWM) generator 212. PWM generator 212 receives signals from a controller 202 that determines the frequency and amplitude of the time varying magnetic field transmitted by transmit coil 106. As discussed above, Qi compliant transmitters often operate between 80 and 200 kHz with usual operating frequencies between 110 kHz and 148 kHz. The typical operating frequency is often 127.7 kHz. However, embodiments according to this disclosure may be applicable to any operating frequency, including those used in standards other than the Qi standard.

A power circuit 206 may receive input power to operate wireless power transmitter 102. Power circuit 206 receives and input voltage, which as illustrated in FIG. 2 is also supplied to bridge 220. Power circuit 206 receives power from a source (e.g., battery, rectified AC power, or other source) and provides voltages for operation of other components of wireless power transmitter 102.

Controller 202 can be any circuit that is capable of executing instructions for performing the functions described in this disclosure. Controller 202 may include any processor, microprocessor, microcomputer, processing device, state machine, or other device capable of performing these functions. In most embodiments, controller 202 is coupled to a memory 208 that includes both volatile and non-volatile memory to store data and executable instructions for operation of processor 202. Controller 202 may be further coupled to an interface 204 for digital communications with other devices. Interface 204 may, for example, support I2C, GPIO, or other user interfaces. Consequently, operating parameters and instructions can be loaded into memory 208 through these interfaces. Controller 202 may also be coupled to receiver sensor data in sensors 218. Sensors 218 includes analog filtering and analog-to-digital converters (ADCs) for providing operational data such as, for example, coil current, temperature data, and other operational data for monitoring by controller 202.

As is further illustrated in FIG. 2, in some embodiments controller 202 is coupled to an FSK modulator 216. FSK modulator 216 provides signals to PWM generator 212 to modulate the frequency of the time varying magnetic field transmitted by transmit coil 106 to encode data by frequency shift keying. FSK modulator 216 encodes the data by shifting the operating frequency of the time varying magnetic field over blocks of 256 consecutive cycles between a base frequency $f_0$ and a modulation frequency $f_{mod}$ to encode the data with logic "1" and logic "0" extending over 512 cycles of the frequency. For example, a logic "0" is encoded by 512 cycles of frequency $f_{mod}$ while a logic "1" is encoded by 256 consecutive cycles at frequency $f_0$ followed by 256 consecutive cycles at frequency $f_{mod}$.

As is further illustrated in FIG. 2, in some embodiments controller 202 is coupled to receive data from ASK decoder 210. ASK decoder 210 may receive input from a peak detector 222 that is coupled to transmit coil 106. In some embodiments, data is encoded at receiver 110 by modulating the load on receiver coil 108, which appears as an impedance change that is measurable at transmit coil 106. Data is encoded as amplitude modulation using a 2 kHz clock frequency to achieve a 2 kbps data rate. Data can be encoded with a logic "1" using two narrow transitions while a logic "0" is encoded using one wider transition. Consequently, a logic "1" is encoded as a high impedance for half a data period and a low impedance for the remaining half while a logic "0" is encoded with a high impedance for both halves of the data bit period. In some embodiments, the opposite scheme may be implemented where a logic "1" is encoded as a low impedance for the first half and high impedance for the second half and a logic "0" is encoded as a low impedance for both halves. Other data encoding schemes that involve receiver 110 modulating an impedance of a resonant circuit that includes receive coil 108 between a high impedance and low impedance state is used.

Peak detector 222 measures the voltage or current at transmit coil 106 and provides a signal to ASK decoder 210. ASK decoder 210 decodes the amplitude modulated data and provides the data to processor 202.

As is further illustrated in FIG. 2, in some embodiments wireless power transmitter 102 can be formed with a single integrated circuit (IC) chip 222 on which at least controller 202, memory 208, interface 204, power circuit 206, PWM generator 212, bridge driver 214, sensor circuit 218, FSK modulator 216, and ASK decoder 210 is formed. Often, bridge 220, peak detector 222, and transmit coil 106 are formed outside of IC 222 because of the size and power requirements of those components and may be mounted on a printed circuit board with IC 222.

Figure 3:
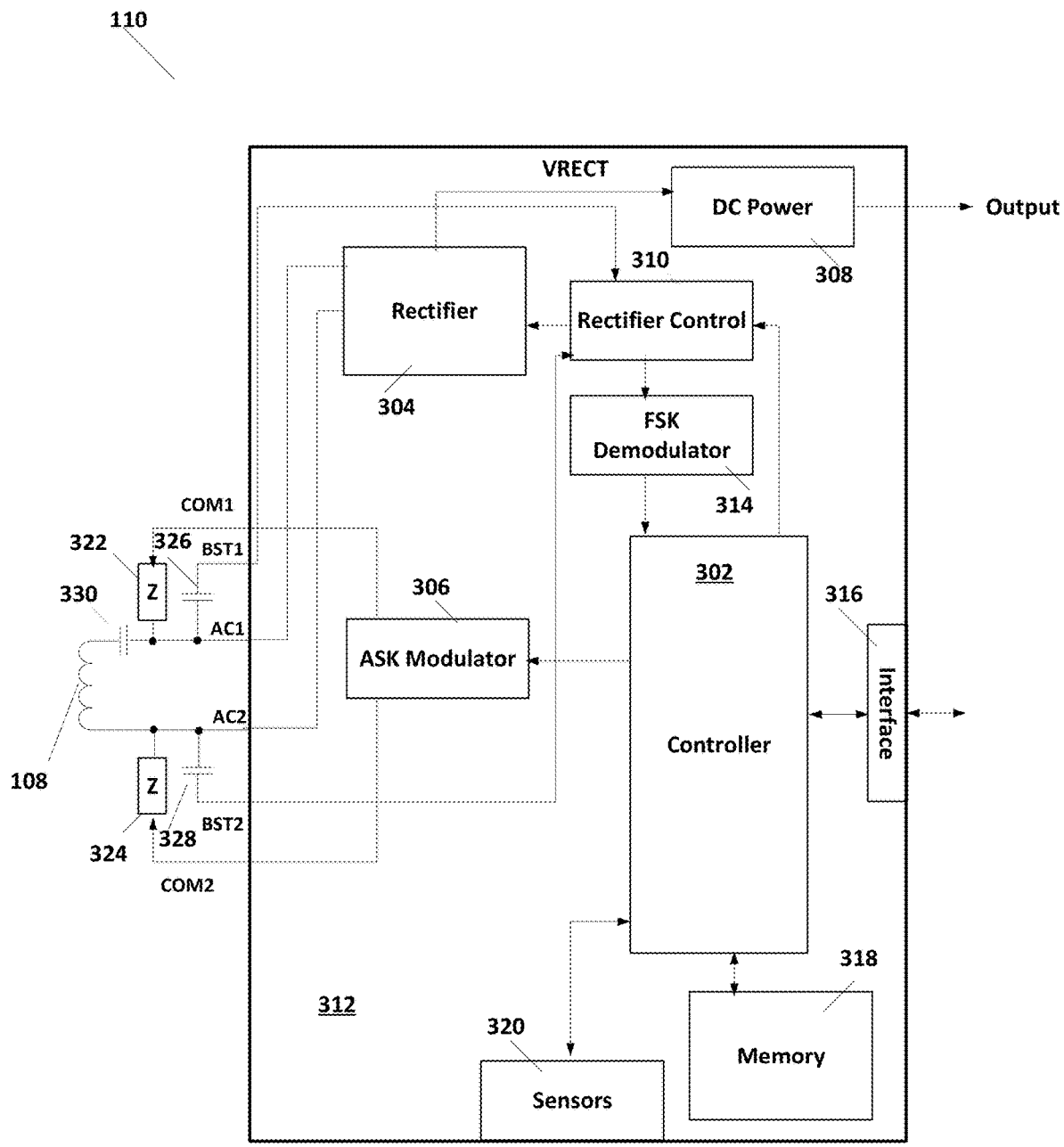
FIG. 3 illustrates a wireless power receiver according to some embodiments as described herein.

FIG. 3 illustrates an example of a wireless power receiver 110 on which embodiments of the present invention may be implemented. As is illustrated in FIG. 3, receiver coil 108 is coupled through a capacitor 330 to a rectifier 304. Receiver coil 108 and capacitor 330 can form an LC resonant circuit with an impedance. Rectifier 304 can be a half-bridge or full-bridge rectifier that is typically formed by FETs. As is illustrated in FIG. 3, the series coupled combination of receive coil 108 and capacitor 330 is coupled between nodes AC1 and AC2.

Rectifier control 304 is controlled by rectifier control 310. In some embodiments, rectifier control 310 controls the FETs of rectifier 304 to synchronously receive and rectify the time varying magnetic field received at receive coil 108. Rectifier control 310 receives input signals from nodes BST1 and BST2. Node BST1 is coupled through capacitor 326 to node AC1. Node BST2 is coupled through capacitor 328 to node AC2. Rectifier control 310 may further receive signals from a controller 302 to control rectifier 304. The received and rectified power is provided to a DC power circuit 308, which provides various DC voltages, including the output voltage to drive load 112. DC power circuit 308 may include filtering as well as DC-DC conversion circuits to provide the various DC voltages.

Rectifier control 304 is also coupled to FSK demodulator 314. FSK demodulator 314 can determine data that has been frequency modulated onto the wireless power signal as described above. FSK demodulator 314 provides the demodulated data that has been received to controller 302.

Controller 302 can be any circuit that is capable of executing instructions for performing the functions described in this disclosure. Controller 302 may include any processor, microprocessor, microcomputer, processing device, state machine, or other device capable of performing these functions. Controller 302 can be coupled to a memory 318 that includes both volatile and non-volatile memory to store data and executable instructions for operation of controller 302. Controller 302 may be further coupled to an interface 316 that allows digital communications with other devices. Interface 316 may, for example, support I2C, GPIO, or other user interfaces. Consequently, operating parameters and instructions can be loaded into memory 318 through these interfaces. Controller 302 may also be coupled to receiver sensor data in sensors 320. Sensors 320 includes analog filtering and analog-to-digital converters (ADCs) for providing operational data such as, for example, coil current, temperature data, and other operational data for monitoring by controller 302.

Controller 302 is further coupled to ASK modulator 306. ASK modulator 306 is coupled through ASK impedance device 322 to node AC1 and through ASK impedance 324. ASK modulator 306 can modulate the load on receive coil 108 by switching on and off impedances 322 and 324 in response to data to be transmitted received from controller 302. In accordance with embodiments according to this disclosure, controller 302 controls ASK modulator 306 such that impedance devices 322 and 324 are transitioned between an "on" state and an "off" state over multiple switching cycles of the received time-varying magnetic field to prevent current and voltage spikes.

In many implementations, ASK modulation impedances 322 and 324 may be capacitors to affect the capacitive loading of receive coil 108. In some embodiments, impedances 322 and 324 may be formed of other impedance components (i.e. inductors and resistors) as well. Switching impedances 322 and 324 then changes the overall impedance of the circuit formed by receive coil 108 and capacitor 330, which results in an ASK signal that meets the Qi specification requirements.

In some embodiments, controller 302 as well as rectifier 304, rectifier control 310, DC power circuit 308, FSK demodulator 314, interface 316, ASK modulator 306, sensors 320, and memory 318 can be formed on a single integrated circuit chip 312. External components such as impedances 322 and 324, capacitors 326, 328, and 338, as well as receive coils 108 may be mounted on a printed circuit board (PCB) with IC 312.

In conventional wireless power receivers switching of impedances 322 and 324 by ASK modulator 306 is switched within a switching cycle of the received time-varying magnetic field and results in current and voltage spikes in wireless power receiver 110. Such spikes can be damaging to components of wireless power receiver 110. Further, in some situations ASK modulator 306 in cooperation with impedances 322 and 324 increases or decreases the ASK signal depth to allow for detection of the ASK signal at wireless power transmitter 102. ASK signal depth may be adjusted due to high signal-to-noise rations (SNRs) or saturation of peak detector 222 and ASK decoder 210 of wireless power transmitter 102. However, in any event, conventional switching of impedances 322 and 324 in ASK modulation can be damaging to wireless power receiver 110.

Figure 4A:
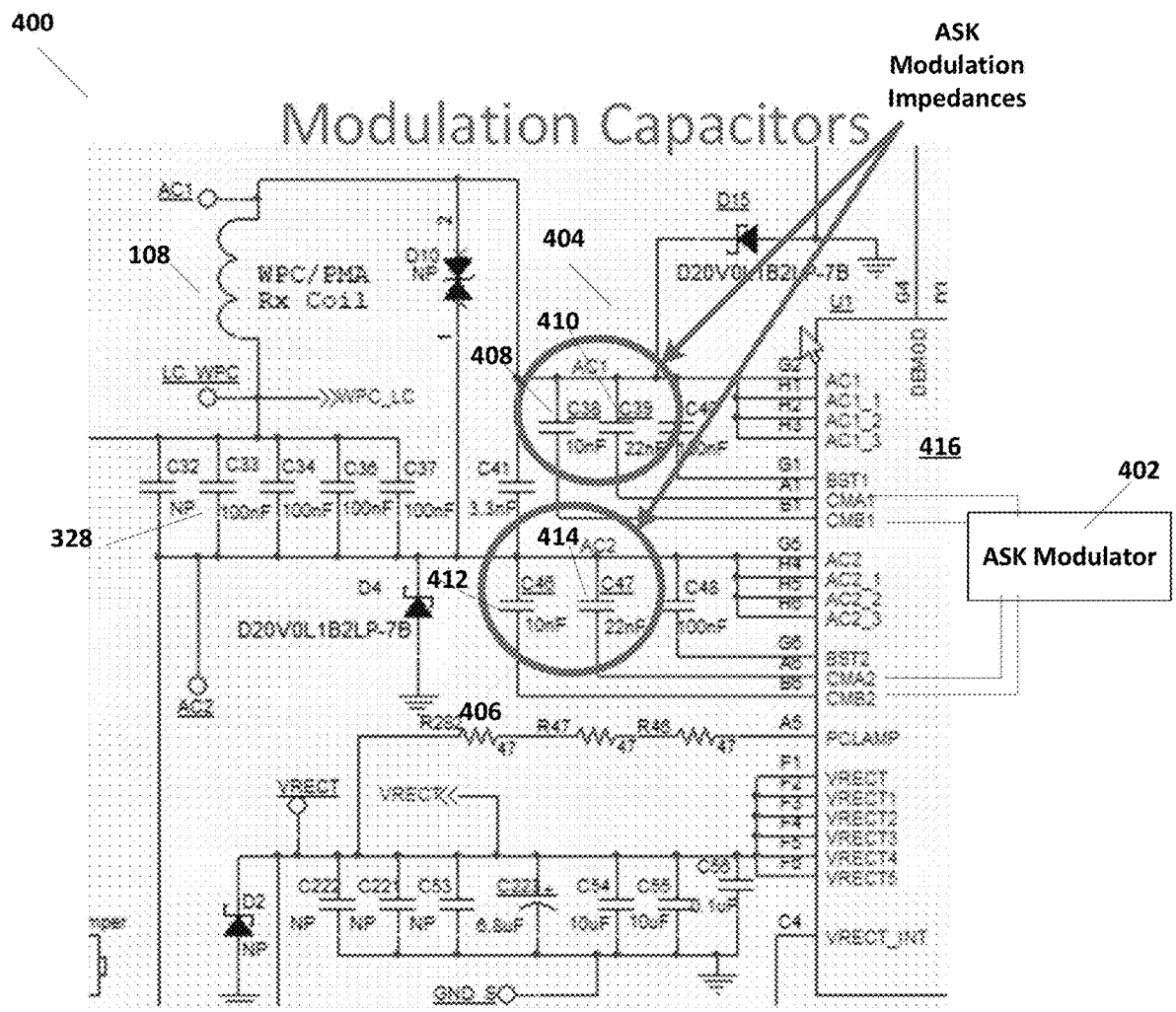
FIGS. 4A, 4B, and 4C illustrate current ASK modulation in a wireless power receiver.
Figure 4B:
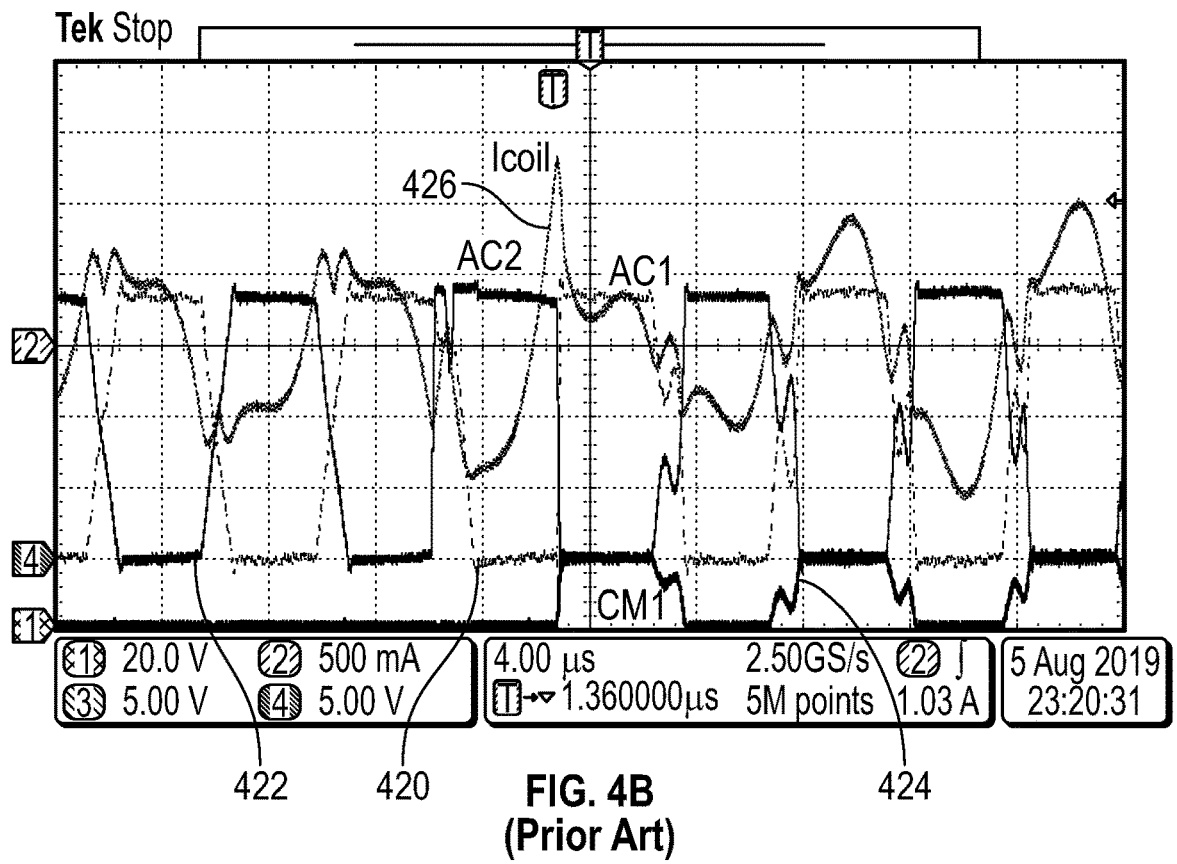
Figure 4C:
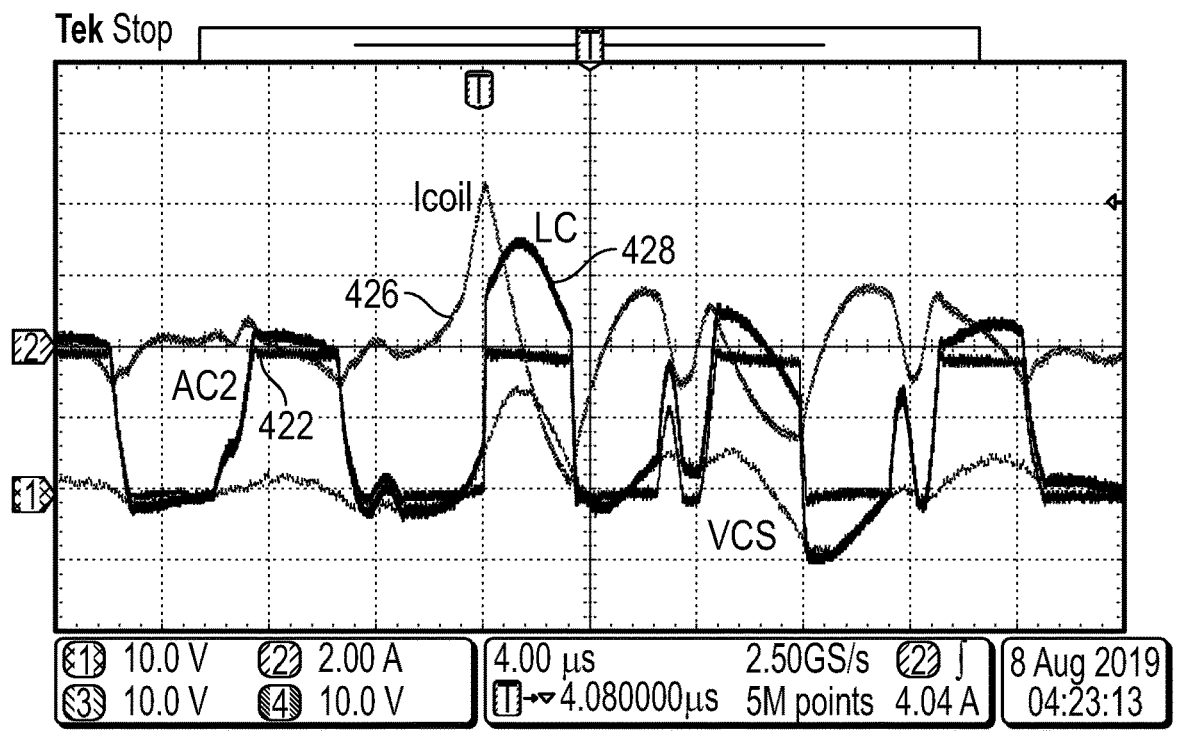

FIGS. 4A, 4B, and 4C illustrate operation of ASK modulation in a conventional wireless power receiver 400. As illustrated in FIG. 4A, IC 416 includes an ASK modulator 402 that is coupled to impedances 404 and 406. Impedances 404 and 406 can each include multiple capacitors that can be switched by ASK modulator 402 to control signal depth. In the example illustrated in FIG. 4A, impedance 404 includes capacitors 408 and 410, which are each independently controlled by ASK modulator 402 to switch capacitance onto node AC1. Similarly, impedances 406 includes capacitors 412 and 414, which are independently controlled by ASK modulator 402 to switch capacitance onto node AC2. Multiple capacitors are often used to control the ASK modulation depth and therefore are switched together according to the modulation depth. Impedances 404 and 406 are switched on and off in between switching cycles to change the impedance of the LC tank to implement the ASK modulation. The switching cycle here refers to the frequency of the wireless power signal, the time-varying magnetic field, that is received at receive coil 108. Switching on and off impedances 404 and 406 as described above changes the resonant energy storage characteristics of the LC tank formed by receive coil 108 and capacitor 328, causing dramatic changes in the currents in coil 108.

FIG. 4B illustrates the situation when impedances 404 and 406 are turned off by ASK modulator 402. Trace 420 illustrates the voltage at node AC1 while trace 422 illustrates the voltage at node AC2 as illustrated in FIG. 4B. As illustrated, the voltages at AC1 and AC2 are driven at the frequency of the time varying magnetic field received at receive coil 108. Trace 424 illustrates turning off the capacitors of impedances 404 and 406, at which point the inductors are floating. Trace 426 illustrates the current through the coil. As is illustrated, the current spikes in the cycle where impedances 404 and 406 are turned off.

The spike on the coil current as illustrated in Trace 426 can result in corresponding spikes on the LC node (the node between receiver coil 108 and capacitor 328). This is illustrated in FIG. 4B, where the voltage on the LC node, trace 428, is illustrated. Large spikes on the LC node can damage circuitry connected to this pin, which may include magnetic secure transmission (MST) isolation MOSFETs or demodulation circuitry.

Embodiments of the present invention operate to reduce or eliminate the spikes resulting in switching in the ASK modulation. In particular, embodiments of receiver 110 according to the present invention include ASK modulator 306 that is controlled by controller 302 to transition between impedance on and off to extend the transition time over a number of cycles of the time-varying magnetic field received by receive coil 108. The number of cycles that can be used to turn on or off the impedances used in the ASK modulation may be four or more cycles, for example four to eight cycles or more. In some embodiments, 10 or more cycles may be used. The number of cycles that it takes to turn on or off the impedances is balanced against maintaining the impedance state over a longer period of time to reduce the spike in coil current that results. In general, the ASK modulation symbol width is about 200 μs, which may span several hundred switching cycles of the received time-varying magnetic field. In which case, even transition times that exceed 10 switching cycles can be used. However, controlling the transition takes processing time, which may also be considered in determining the transition times.

There may be several ways of transition the ASK impedances 322 and 324 between "on" and "off" states over several switching cycles to affect the ASK modulation. In some embodiments, the impedances are slowly turned on by a slow turn-on of the capacitors by adjusting the current to impedances 322 and 324 from a low current to a high current. For example, the impedance of a control switch can act as a variable current source, slowly transitioning from low current to high current over the number of switching cycles of the time-varying magnetic field received by receive coil 108. In some embodiments, a pulsed turn-on of the capacitors of the impedances can be used to slowly increase the voltage across the capacitors on each switching cycle until a full voltage is achieved. Each of these embodiments can be used to dynamically change the modulation depth of a system without requiring the use of multiple parallel capacitors (as is illustrated in wireless power receiver 400 of FIG. 4A). Further, control of the modulation depth allows operation in either the wireless power consortium (WPC), Qi standard, or the power matters alliance (PMA) protocols.

In some further embodiments, the ASK modulator 306 adjusts the value of impedances 322 and 324 over time to slowly (four or more switching cycles) transition the impedances between "on" and "off" states. In particular, impedances 322 and 324 may be complex impedances formed by an array of individual smaller impedances, each of which can be switched on or off to vary the overall value of impedances 322 and 324. The complex impedances 322 and 324 can be formed of arrays of capacitances, resistances, and inductances or combinations of capacitors, resistances, and inductances that are individually turned on or off to slowly turn on or off an overall impedance load to the LC circuit formed by the series receiver coil 108 and capacitor 330 pair. Consequently, a transition of impedances between "on" and "off" states is accomplished over a number of switching cycles of the magnetic field received by receive coil 108.

Figure 5A:
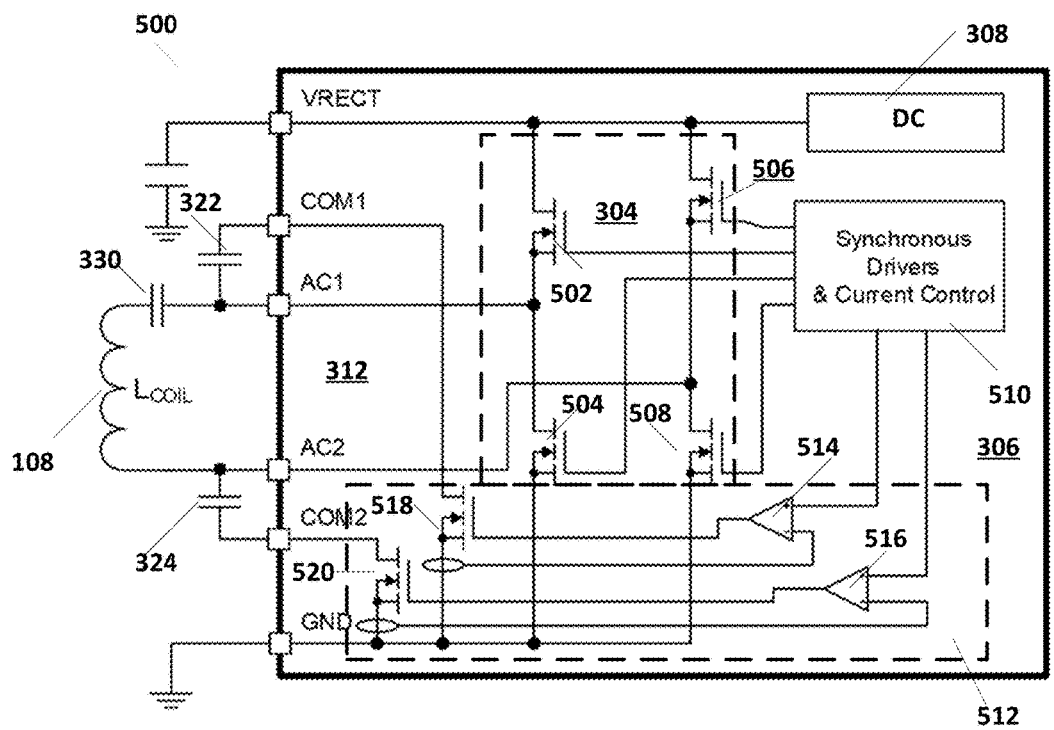
FIGS. 5A and 5B illustrate ASK modulation implemented in the wireless power receiver illustrated in FIG. 3 according to some embodiments.
Figure 5B:
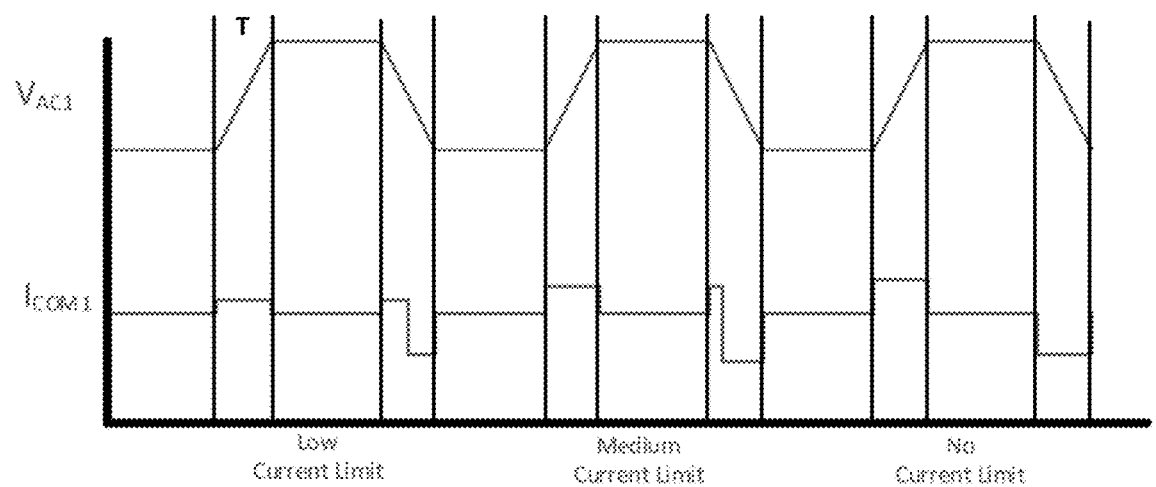

FIGS. 5A and 5B illustrate an example embodiment of receiver 110 where the current to impedances 322 and 324 is controlled to transition those impedances to "on" and "off" states over multiple switching cycles. As discussed above, transitioning between "on" and "off" over multiple switching cycles of the time-varying magnetic field received at receiver coil 108 allows for reduction or elimination of current spikes that may damage components in wireless power receiver 110.

FIG. 5A illustrates an embodiment of wireless power receiver 110, receiver 500, where the current to impedances 322 and 324 is controlled during ASK modulation switching. In the particular example illustrated in FIG. 5A, impedances 322 and 324 are illustrated as formed by single capacitors. However, impedances 322 and 324 can be formed of complex impedances using a combination of capacitors, resistors, and inductors.

In FIG. 5A, rectifier 304 is formed by transistors 502, 504, 506, and 508. As indicated, rectifier 304 includes transistors 502 and 504 coupled in series between VRECT and ground (GND) with the node between transistor 502 and transistor 504 coupled to node AC1. Similarly, rectifier 304 includes transistor 506 and 508 coupled in series between VRECT and ground (GND) with the node between transistors 506 and 508 coupled to node AC2. The gates of transistors 502, 504, 506, and 508 are controlled by block 510, which includes rectifier control 310 as illustrated in FIG. 3 controlled by controller 302.

When ASK modulator 306 begins an event (in this disclosure an "event" refers to when ASK modulator 306 transitions impedances 322 and 324 between "on" and "off" states), control circuitry 510 sets a current target for impedances 322 and 324 at nodes COM1 and COM2. As discussed above, in the embodiment illustrated in FIG. 5A impedances 322 and 324 are capacitors. Consequently, control 510 affects current control circuit 512 to ramp the current at nodes COM1 and COM2 until impedances 322 and 324 have completely transitioned (i.e. either from "on" to "off" or from "off" to "on"). Over a period of several switching cycles, the current target is slowly increased (or decreased) until the impedances are effectively "on" or "off."

In the example embodiment illustrated in FIG. 5A, current control circuit 512 includes an FET 518 coupled between ground and impedance 322 at node COM1. The gate of FET 518 is controlled by op-amp 514. Op-amp 514 receives a first input from controller 510 indicating a current target for node COM1 and a second input indicating the current through transistor 518. As illustrated in FIG. 5A, current control circuit 512 further includes an FET 520 coupled between ground and impedances 324 at node COM2. The gate of FET 520 is controlled by op-amp 516. Op-amp 516 receives a first input from controller 510 indicating a current target for node COM2 and a second input indicating the current through FET 520. As discussed above, the current targets for COM1 and COM2 are achieved by op-amps 514 and 516 controlling the operation of FETs 518 and 520, respectively. As is further discussed above, control 510 ramps the current targets either up or down over several switching cycles in order to turn the impedances "on" or "off."

In some embodiments, current control circuit 512 is controlled by current control 510 to operate during the dead time between switching cycles. As illustrated in FIG. 5A, current controller 510 includes rectifier control 310 as illustrated in FIG. 3, which monitors and tracks the switching cycles of the time-varying magnetic field received by receiver coil 108 resulting in power rectification by rectifier 304 and allow identification of the dead time. Embodiments according to some embodiments may keep the current source on continuously throughout the switching cycle, only provide active current control during charging, or some combination of these alternatives.

As discussed above, controller 510 includes rectifier control 310 and controller 302. Controller 302 executes instructions to transition impedances 322 and 324 to "on" or "off" during each ASK modulation event. Consequently, controller 510 executes code to ramp impedances 322 and 324 over several switching cycles as described here. Further, the layout of IC chip 312 of wireless power transmitter 500 is further illustrated in FIG. 5A, with some pin connections (VRECT, COM1, AC1, AC2, COM2, and GND) identified.

FIG. 5B illustrates operation of ASK modulator 306 as illustrated in FIG. 5A. FIG. 5B illustrates the voltage at node AC1 while the state of impedance 322 is altered. The behavior of the voltage at node AC2 and current through FET 520 is similar. The current through FET 518 at node COM1 is illustrated as well. As is illustrated, transitioning between states takes a transition time T that spans several switching cycles (e.g., four or more) of the received magnetic field. FIG. 5B further illustrates operation with low current limits, medium current limits, and no current limits.

It should be noted that in transition from high voltage at node AC1 to low voltage at node AC1, when the AC voltage drops below the voltage on the capacitor the capacitor naturally discharges though the parasitic body diode of the current source. In some embodiments, this effect does not occur and instead a constant discharge current is used. In some embodiments, a discharge current can be synchronously turned on to precisely discharge impedances 322 and 324 in a manner to minimize disturbances to the system. Further, FIG. 5B illustrates the case of constant current limits (i.e., the current limits are not controlled to ramp over time).

The embodiment of receiver 110, receiver 500, illustrated in FIGS. 5A and 5B causes the impedance of the LC network to be slowly changed over multiple switching cycles, allowing natural, passive stabilization and a prevention of the ICOIL spike as illustrated in the conventional cases illustrates in FIGS. 4A, 4B, and 4C.

As the current source formed by FETs 518 and 520 is an impedance as well, some embodiments may provide a more complex methodology may be executed by control 510 where receiver 500 uses a combination of current source impedance and then jumps to fully "on" when the current source at cap is close to the target final impedance for the given switching transition.

In some embodiments as illustrated in FIG. 5A, the depth of the ASK modulation can be controlled by limiting the total maximum current that defines the "on" state of impedances 322 and 324. The controller 502 can then ramp the current up to the limited total maximum current to provide an "on" state and ramp the current from the total maximum current to ramp to an "off" state.

FIG. 5A specifically illustrates current control 512 formed with op-amps 514 and 516. However, in some embodiments the same effect can be achieved through the use of current mirrors or other techniques known to those familiar in the art of semiconductor circuitry design to more fully control the currents through FETs 518 and 520.

Figure 6A:
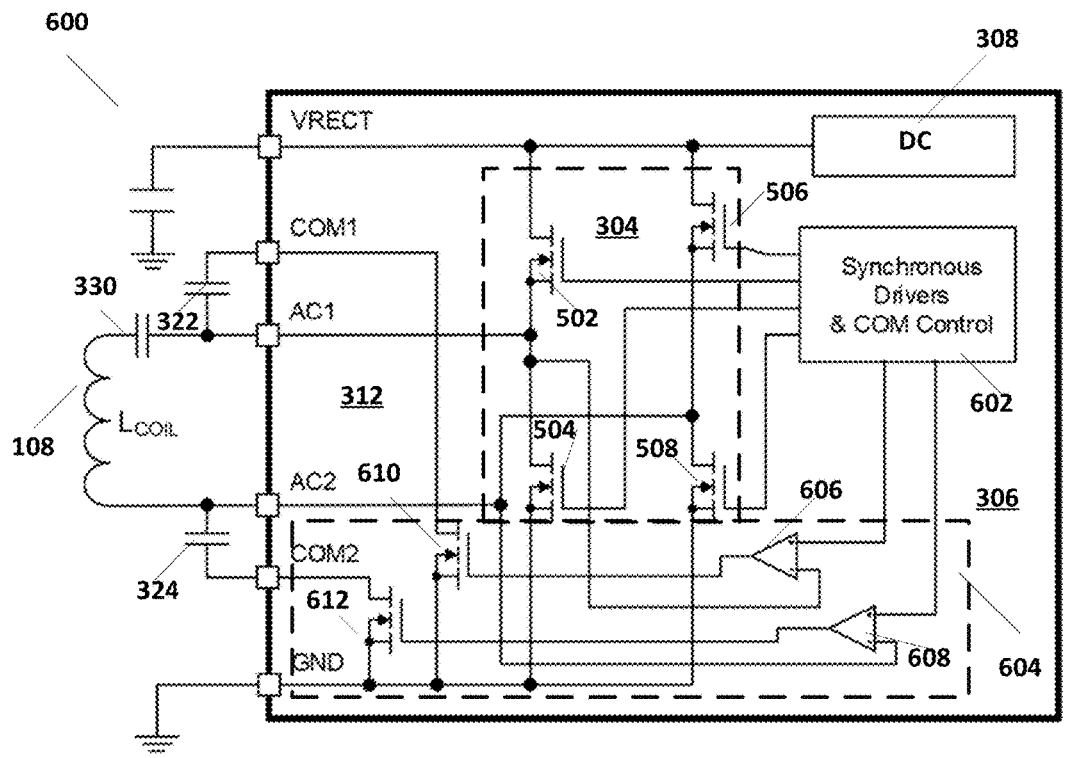
FIGS. 6A and 6B illustrate ASK modulation implemented in the wireless power receiver illustrated in FIG. 3 according to some embodiments.
Figure 6B:
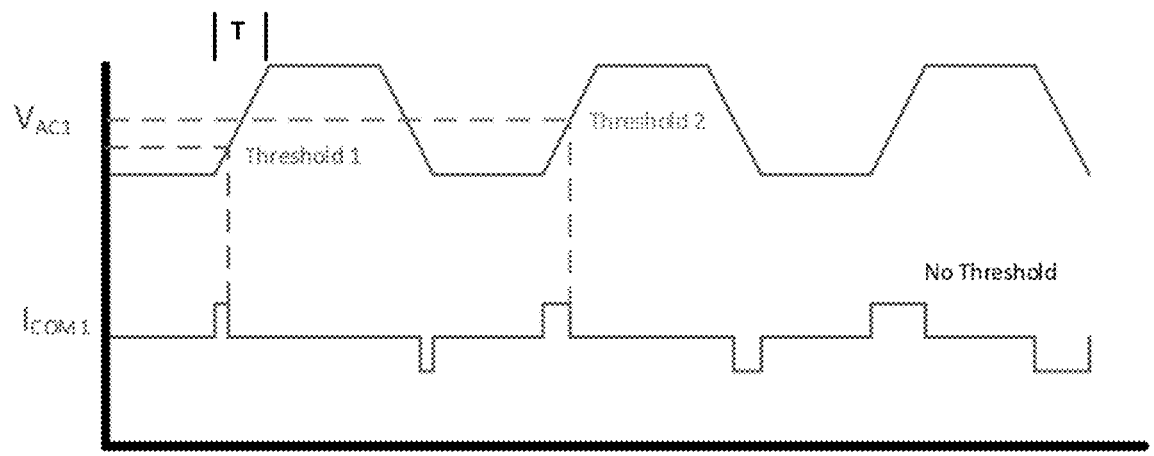

FIGS. 6A and 6B illustrate another example embodiment of receiver 110 where the voltage to impedances 322 and 324 is controlled to transition those impedances "on" and "off" over multiple switching cycles. As discussed above, transitioning the transitions between "on" and "off" over multiple switching cycles of the time-varying magnetic field received at receiver coil 108 allows for reduction or elimination of current spikes that may damage components in wireless power receiver 110. In the example illustrated in FIG. 6A, as discussed in more detail below, the voltage across impedances 322 and 324 is increased or decreased as a function of the voltages on AC1 and AC2 to transition impedances 322 and 324 between "on" states and "off" states over multiple switching cycles of the time-varying magnetic field.

FIG. 6A illustrates an embodiment of receiver 110, receiver 600, where the voltages to impedances 322 and 324 are controlled to transition between "on" and "off" during ASK modulation. In the example illustrated in FIG. 6A, impedances 322 and 324 are illustrated as capacitances, however impedances 322 and 324 may be complex impedances formed by combinations of capacitors, resistors, and inductors. Controller 602 includes rectifier control 310 and controller 302 to provide signals to voltage control circuit 604. The signals provided to voltage control circuit 604 may include pulse-width modulated (PWM) voltage signals to control the voltages on nodes COM1 and COM2. In some embodiments, PWM voltage signals may be generated using a clock signal in controller 602. In some embodiments, as is illustrated in FIG. 6A, the PWM is implemented by comparison with the respective AC node voltages. In some embodiments, the PWM is generated by voltage threshold transition. In some embodiments, controller 602 may provide voltage signals that allow for a pulsed increase of the voltage across impedances 322 and 324 when the voltage signals are compared with the voltages at nodes AC1 and AC2.

In the example illustrated in FIG. 6A, voltage control circuit 604 receives signals into comparators 606 and 608. The output signals from comparators 606 and 608 drive the gates of FETs 610 and 612, respectively. FET 610 is coupled between node COM1 and ground (GND) and effects impedance 322. FET 612 is coupled between node COM2 and GND and effects impedance 324. Comparator 606 receives a voltage signal from controller 602 and compares with the voltage on node AC1 to provide a gate voltage to FET 610. Similarly, comparator 608 receives a voltage signal from controller 602 and compares with the voltage on node AC2 to provide a gate voltage to FET 610. Consequently, node COM1 is coupled to ground when the voltage signal is greater than AC1 and disconnected from ground otherwise. Similarly, node COM2 is coupled to ground when the voltage signal is greater than AC2 and disconnected from ground otherwise. In that fashion, the impedances 322 and 324 can be increased or decreased as the voltage is increased or decreased to affect the transition.

As discussed above, in some embodiments controller 602 can provide PWM signals directly to the gates of transistors 610 and 612. In that case, comparators 606 and 608 are omitted. The PWM signals can be synchronized with the voltages on AC1 and AC2 to provide for a transition of impedances 322 and 324 over several switching cycles of the time-varying magnetic field.

When an ASK modulation event is begun or ended (either turning "on" or "off" of impedances 322 and 324) by ASK modulator 306, control circuit 602 sets a threshold to control the turn on and/or turn off FETs 610 and 612 to nodes COM1 and COM2. As discussed above, the voltage target is compared to the voltage on the AC1 and AC2 nodes respectively in order to adjust the voltage on nodes COM1 and COM2 over multiple switching cycles.

Controller 602 includes rectifier control 310 and controller 302. Controller 302 executes instructions to transition impedances 322 and 324 during each ASK modulation event. Consequently, controller 602 executes code to ramp impedances 322 and 324 over several switching cycles as described here. In some embodiments, voltage control circuit 604 is controlled by current control 602 to operate during the dead time between adjacent switching cycles. As illustrated in FIG. 6A, current controller 602 includes rectifier control 310 as illustrated in FIG. 3, which monitors and tracks the switching cycles of the magnetic field received by receiver coil 108 resulting in power rectification by rectifier 304 to allow identification of the dead time.

Further, the layout of IC chip 312 of wireless power transmitter 600 is further illustrated in FIG. 6A, with some pin connections (VRECT, COM1, AC1, AC2, COM2, and GND) identified.

In some embodiments, the Turn_on/Turn_off characteristics of impedances 322 and 324 can also be set with other techniques such as adjustments with a fixed time delay. Embodiments as illustrated in FIG. 6A can also adjust modulation depth without the need to provide additional capacitors by adjusting the ending voltage at COM1 and COM2.

As illustrated in the waveforms illustrated in FIG. 6B, over a period T of several switching cycles the voltage target is slowly increased (or decreased) until FETs 610 and 612 are effectively "on" (or "off") at all times. FIG. 6B illustrates transitions of impedance 322 at AC1 and the operation of FET 610. Similar behavior is observed for transitions of impedance 324 at AC2 and the operation of FET 612. FIG. 6B illustrates the transition as well as current at COM 1 using various threshold levels for setting voltage thresholds in controller 602.

In some embodiments, the implementation of voltage circuit 604 is only active during the dead time between switching cycles. Other methods are also envisioned inducing keeping the voltage on continuously. As illustrated in FIG. 6B, in the falling edge cases shown below the capacitor naturally discharges though the parasitic body diode of the switching FET 610. However, this is not required as one skilled in the art can see how the techniques used at turn on can similarly be applied at turn off transitions.

As illustrated in FIG. 6B, receiver 600 as illustrated in FIG. 6A causes the impedance of the network to be slowly changed over multiple switching cycles, allowing natural, passive stabilization and a prevention of current spikes through receiver coil 108. The example illustrated in FIG. 6A illustrates the use of comparators 606 and 608. However, the same results can be achieved through the use of source follower or using other techniques known to those familiar in the art of semiconductor circuitry design to control the voltages at nodes AC1 and AC2 to slowly transition the state of impedances 322 and 324.

In some embodiments as illustrated in FIG. 6A, the depth of the ASK modulation can be controlled by limiting the total voltage, which defines the "on" state of impedances 322 and 324. The controller 602 can then ramp the current up to the limited total maximum current to provide an "on" state and ramp the current from the total maximum current to ramp to an "off" state.

Figure 7A:
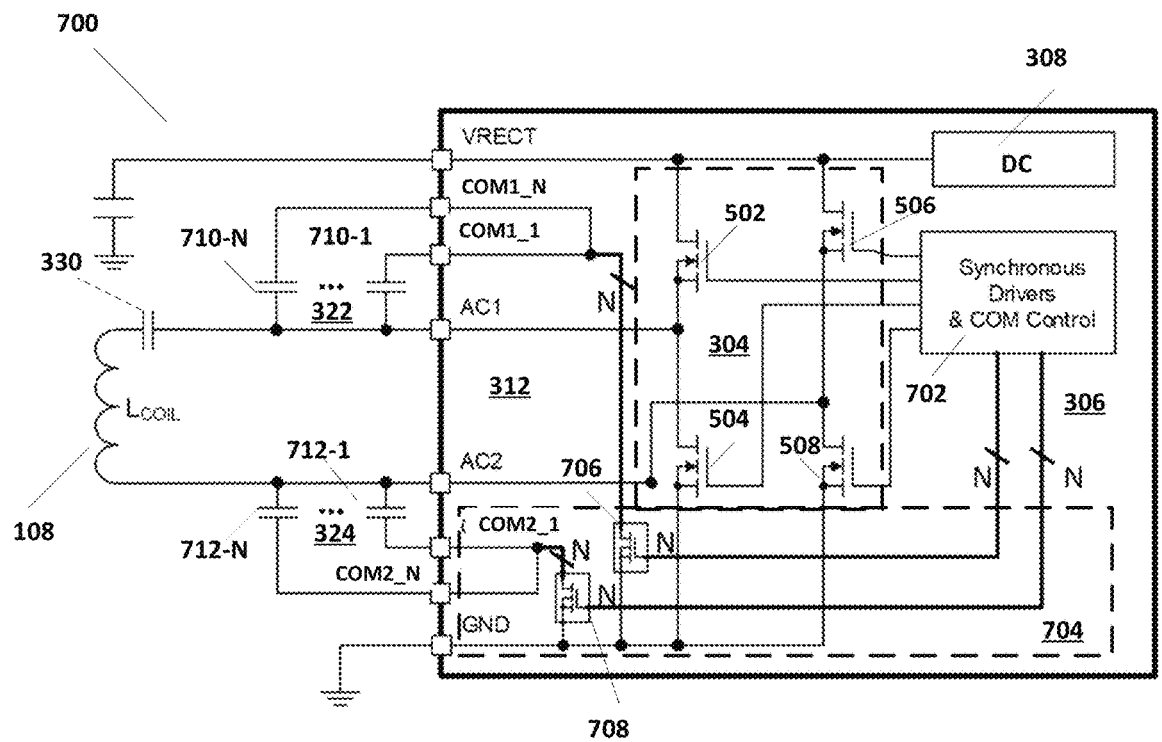
FIGS. 7A and 7B illustrate ASK modulation implemented in the wireless power receiver illustrated in FIG. 3 according to some embodiments.
Figure 7B:
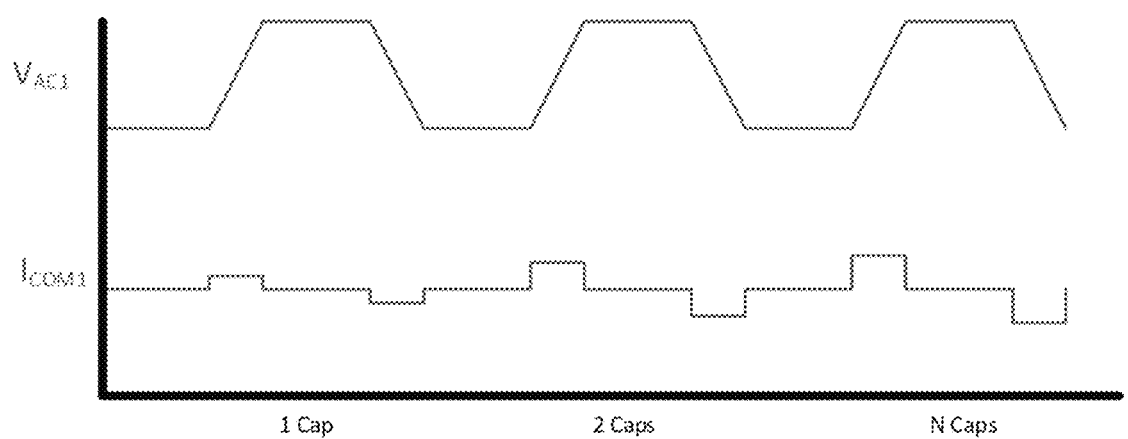

FIGS. 7A and 7B illustrate an embodiment of receiver 110, receiver 700, where the impedance of impedances 322 and 324 is ramped to transition impedances 322 and 324 between "on" and "off" states. In the particular example illustrated in FIG. 7A, impedance 322 includes N capacitors 710-1 through 710-N. Similarly, impedance 324 includes N capacitors 712-1 through 712-N. In this configuration each of capacitors 710-1 through 710-N and capacitors 712-1 through 712-N are arranged to be turned on or off to ramp the total impedances of impedances 322 and 324 to full on or full off. As such, as each of transistors 710-1 through 710-N and 712-1 through 712-N are switched on or off, the impedance is increased or decreased to reduce spikes in the current of transmit coil 108. In some implementations capacitors 710-1 through 710-N and capacitors 712-1 through 712-N may be binary weighted to allow incremental increase in effective capacitive loading. In some embodiments, the array of impedances 712-1 through 712-N can include capacitors, resistors, and inductors.

As is illustrated in FIG. 7A, controller 702 provides signals to impedance controller 704 to switch on or off capacitors 710-1 through 710-N and 712-1 through 712-N. As is illustrated in FIG. 7A, impedance controller 704 includes switching networks 706 and 708. Switching network 706 can include an array of N transistors that couple capacitors 710-1 through 710-N through one of the N transistors in switching network 706 to ground in accordance with the signals from controller 702. Similarly, switching network 708 can include an array of N transistors that couple capacitors 712-1 through 712-N to ground in accordance with the signals from controller 702.

As discussed above, controller 702 includes rectifier control 310 and controller 302. Controller 302 executes instructions to transition impedances 322 and 324 to "on" or "off" during each ASK modulation event. Consequently, controller 702 executes code to transition impedances 322 and 324 over several switching cycles as described here. In some embodiments, impedance control circuit 704 is controlled by controller 702 to operate to switch impedances during the dead time between switching cycles. Controller 702 can determine the switching dead times by monitoring rectifier control 310.

Further, the layout of IC chip 312 of wireless power transmitter 700 is further illustrated in FIG. 7A, with some pin connections (VRECT, AC1, AC2, and GND) identified. The embodiment illustrated in FIG. 7A can be ideal as it slowly turns on or off the impedances as ramped by controller 702. In implementations where most of transmitter 700 is formed on IC 312 the solution uses more IC pins and more components on the PCB than is found in other embodiments or more conventional receivers. As illustrated in FIG. 7A, pins COM1_1 through COM1_N are coupled to capacitors 710-1 through 710-N, respectively, while pins COM2_1 through COM2_N are coupled to capacitors 712-1 through 712-N, resulting in 2N pins for communications instead of 2 or 4 pins. Further, capacitors 710-1 through 710-N as well as capacitors 712-1 through 712-N are mounted on the PCB with IC 312. Such number of pins and extra space on the PCBs may be detrimental to some uses, for example in mobile phone applications where space is limited.

In the embodiment of wireless transmitter 700 illustrated in FIGS. 7A and 7B, when an ASK modulation event is begun, control circuit 702 sets a number and sequence of communication capacitors to turn on and/or off and signs the signals to switches 706 and 708 in turn for activation of the chosen ones of capacitors 710-1 through 710-N and 712-1 through 712-N. As the amount of capacitance is changed the effective capacitive impedance of impedances 322 and 324 is also changed. Over a period of several switching cycles the number of capacitors and effective capacitance on the AC nodes AC1 and AC2 can be slowly changed until the desired operating point is reached.

The voltage at node AC1 and the current at the communications pins (collectively COM1) is illustrated in FIG. 7B. It should be noted that in the falling edge cases shown in FIG. 7B, the capacitor naturally discharges though the parasitic body diode of the switching MOSFET in switch array 706. This causes the impedance of the network to be slowly changed over multiple switching cycles, allowing natural, passive stabilization and a prevention of the ICOIL spike. Embodiments as illustrated in FIG. 7A can also control modulation depth by limiting the over number of capacitors that are on for a full-on state.

As discussed above, embodiments of a wireless power transmitter that controls ASK modulation impedance during turn on and turn off limits or eliminates the resulting disturbances to the wireless power transfer/system. Although examples of embodiments above are illustrated where ASK modulation impedances 322 and 324 have been implemented by capacitances. However, other impedances (i.e., resistances or inductances) may also be utilized in in ASK modulation impedances 322 and 324 implemented herein.

Figure 8:
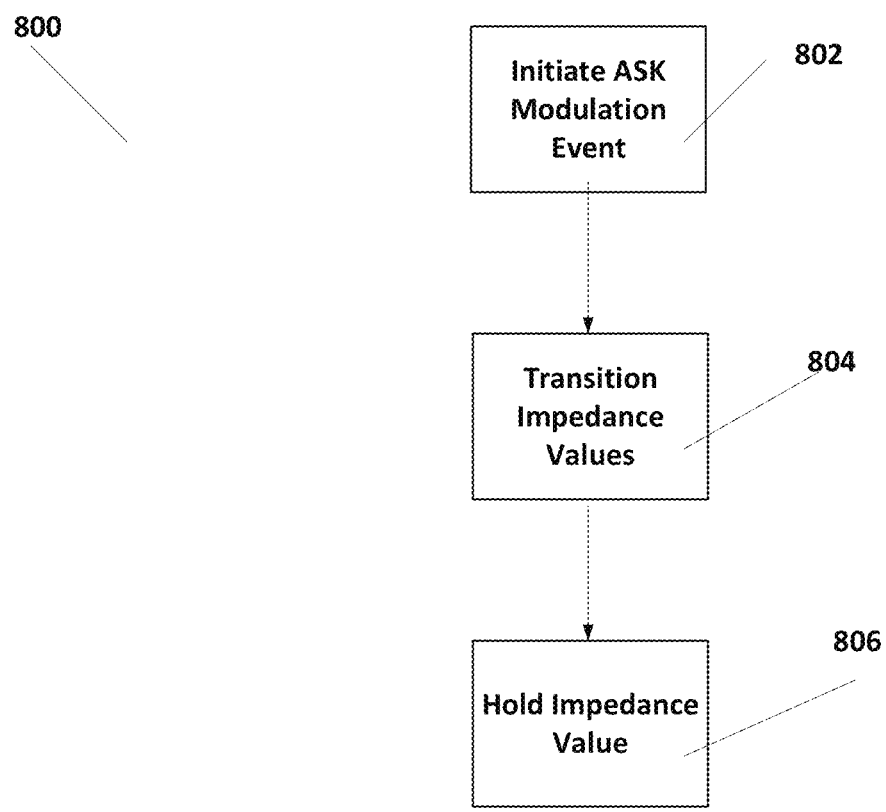
FIG. 8 illustrates a process implemented in the wireless power receiver illustrated in FIG. 3 according to some embodiments.

FIG. 8 illustrates a method 800 according to some embodiments. As illustrated in FIG. 8, method 800 is initiated in step 802 where ASK modulation either turns "on" impedances 322 and 324 or turns "off" impedances 322 and 324. In step 804, controller 302 ramps the impedances 322 and 324 so that the transition occurs over multiple switching cycles of the received magnetic field. In step 806, once the transition has concluded (i.e. impedances 322 and 324 are fully "on" or "off," then method 800 holds the impedance value until the next ASK modulation event is initiated. As a consequence, as is illustrates in FIGS. 5B, 6B, and 7B, during data transmission the transition between high impedance and low impedances states occurs over multiple switching cycles.

In some embodiments, in step 804 the current through the impedances 322 and 324 is limited to reduce the effective impedance of impedances 322 and 324. This embodiment is specifically illustrated in FIGS. 5A and 5B. In some embodiments, this method may be used to control modulation depth by limiting the turn-on values of impedances 322 and 324.

In some embodiments in step 804 the voltage through impedances 322 and 324 is limited to reduce the effective impedances 322 and 324. An example of this embodiment is illustrated in FIGS. 6A and 6B. In some embodiments, impedances 322 and 324 is controlled with a PWM provided by the system. In some embodiments, the PWM signal is generated by a clock. In some embodiments, the PWM signal is generated by a voltage threshold transition. In some embodiments, the voltage threshold is compared against the respective AC node voltages to control the voltages to impedances 322 and 324. In some embodiments, the control modulation depth can be controlled by limiting the turn-on values of impedances 322 and 324.

In some embodiments, in step 804 ASK modulation impedances 322 and 324 each include a plurality of individual impedances which are switched to ramp the total impedances 322 and 324 to an "on" or "off" state. The plurality of individual impedances may be turned on or off in sequence to manage the impedance values of impedances 322 and 324. In some embodiments, the plurality of individual impedances may have a binary weighting.

The above detailed description is provided to illustrate specific embodiments of the present invention and is not intended to be limiting. Numerous variations and modifications within the scope of the present invention are possible. The present invention is set forth in the following claims.

What is claimed is:

1. A method of amplitude shift key (ASK) modulation in a wireless power receiver, comprising:
    initiating transition of an ASK impedance from a first state to a second state, the ASK impedance being coupled to a resonant circuit that includes a wireless power receive coil that receives a time-varying magnetic field;
    transitioning the ASK impedance from the first state to the second state according to the transition over a plurality of switching cycles of the time-varying magnetic field; and
    holding the second state,
    wherein the ASK impedance is formed from a plurality of impedances and wherein ramping the ASK impedance includes controlling which of the plurality of impedances are engaged in the ASK impedance.

2. The method of claim 1, wherein the first state is an "off" state and the second state is an "on" state.

3. The method of claim 1, wherein the first state is an "on" state and the second state is an "off" state.

4. The method of claim 1, wherein transitioning the ASK impedance includes controlling current to the ASK impedance.

5. The method of claim 4, wherein a maximum current is set to control an ASK modulation depth.

6. The method of claim 1, wherein transitioning the ASK impedance includes controlling voltage to the ASK impedance by pulsing the voltage across the ASK impedances.

7. The method of claim 6, wherein pulsing the voltage across the ASK impedances includes applying a pulse-width modulated (PWM) signal to control the voltage.

8. The method of claim 6, wherein pulsing the voltage across the ASK impedances includes comparing a received power voltage with a target voltage.

9. The method of claim 6, wherein a maximum voltage is set to control an ASK modulation depth.

10. The method of claim 1, further including controlling depth of the ASK modulation by controlling a maximum impedance.

11. The method of claim 1, wherein a maximum number from the plurality of impedances is determined to control an ASK modulation depth.

12. The method of claim 1, wherein impedances in the plurality of impedances are binary weighted.

13. The method of claim 1, wherein transitioning the ASK impedance includes adjusting the ASK impedance during a dead time of the switching cycle.

14. A wireless power receiver with ASK modulation, comprises:
    a rectifier coupled to receive wireless power from a resonant circuit that includes a receiver coil;
    an impedance control circuit coupled to ASK impedances coupled to affect impedance of the resonant circuit, wherein the ASK impedances are formed from a plurality of impedances and wherein the impedance control circuit controls which of the plurality of impedances are engaged in the ASK impedance; and
    a controller coupled to the rectifier and the impedance control circuit,
    wherein the controller includes executes instructions to
        initiate transition of the ASK impedances from a first state to a second state;
        transition the ASK impedance from the first state to the second state according to the transition over a plurality of switching cycles of a time-varying magnetic field received by the resonant circuit; and
        hold the second state.

15. The wireless power receiver of claim 14, wherein the first state is an "off" state and the second state is an "on" state.

16. The wireless power receiver of claim 14, wherein the first state is an "on" state and the second state is an "off" state.

17. The wireless power receiver of claim 14, wherein the impedance control circuit controls current to the ASK impedances.

18. The wireless power receiver of claim 14, wherein the impedance control circuit controls voltage to the ASK impedances by pulsing the voltage across the ASK impedances.

19. The wireless power receiver of claim 18, wherein pulsing the voltage includes applying a pulse-width modulated (PWM) signal that controls the voltage.

20. The wireless power receiver of claim 18, wherein pulsing the voltage across the ASK impedances includes comparing a received power voltage with a target voltage.

21. The method of claim 6 wherein impedances in the plurality of impedances are binary weighted.

22. The wireless power receiver of claim 14, further including controlling depth of the ASK modulation by controlling a maximum impedance.

23. The wireless power receiver of claim 22, wherein impedances in the plurality of impedances are binary weighted.

24. The wireless power receiver of claim 14, wherein ramping the ASK impedance includes adjusting the ASK impedances during a dead time of the switching cycle.

* * * * *